United States Patent
Lee et al.

(10) Patent No.: US 11,542,664 B2
(45) Date of Patent: Jan. 3, 2023

(54) PROCESS FOR MAKING A MULTI-PLY DISPERSIBLE WIPE

(71) Applicant: Kimberly-Clark Worldwide, Inc., Neenah, WI (US)

(72) Inventors: SangSoo Lee, Yongin-si (KR); David Andrew Moline, Appleton, WI (US); Colin Ackroyd, Harsham (GB)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 321 days.

(21) Appl. No.: 16/955,660

(22) PCT Filed: Dec. 20, 2017

(86) PCT No.: PCT/US2017/067626
§ 371 (c)(1),
(2) Date: Jun. 18, 2020

(87) PCT Pub. No.: WO2019/125438
PCT Pub. Date: Jun. 27, 2019

(65) Prior Publication Data
US 2020/0385931 A1 Dec. 10, 2020

(51) Int. Cl.
*B65B 25/14* (2006.01)
*B65B 35/50* (2006.01)
(Continued)

(52) U.S. Cl.
CPC ............ *D21H 27/40* (2013.01); *B31F 1/07* (2013.01); *B31F 5/022* (2013.01); *B32B 5/022* (2013.01);
(Continued)

(58) Field of Classification Search
CPC ......... B65B 25/14; B65B 35/50; B65B 63/00; D21H 11/18; D21H 15/04; D21H 23/50;
(Continued)

(56) References Cited

U.S. PATENT DOCUMENTS 4,300,981 A * 11/1981 Carstens ............... D21H 27/38
162/131
4,574,021 A 3/1986 Endres et al.
(Continued)

FOREIGN PATENT DOCUMENTS

AU 2016203733 A1 12/2016
CN 105463703 A 4/2016
(Continued)

OTHER PUBLICATIONS

AliExpress, "100 pcs/bag Baby Wet Wipes for Kids Portable Wet Wipes Hand & Mouth Baby Wipes Baby Travel Wet Wipes Baby Care Cloths SJ03", https://www.aliexpress.com/item/100pcs-Baby-Wet-Wipes-For-Kids-Portable-Wet-Wipes-Hand-Mouth-Baby-Wipes-Baby-Travel-Wet/32665638925.html?spm=2114.40010208.4.18. Ch5a3f, Feb. 8, 2017.

*Primary Examiner* — Stephen F. Gerrity
(74) *Attorney, Agent, or Firm* — Kimberly-Clark Worldwide, Inc.

(57) ABSTRACT

A process for making a multi-ply dispersible wipe includes providing a first web and a second web, each web comprising cellulose fibers; superposing the first web over the second web; applying an aqueous solution to at least the first web; after the aqueous solution is applied to the first web, crimping the second web to the first web to create a composite web; cutting or perforating the composite web to define a plurality of multi-ply wet wipes; and packaging the composite web/wet wipes into a package.

17 Claims, 5 Drawing Sheets

(51) Int. Cl.
*B31F 5/02* (2006.01)
*B65B 63/00* (2006.01)
*D21H 27/40* (2006.01)
*B32B 5/02* (2006.01)
*B32B 5/26* (2006.01)
*B32B 37/20* (2006.01)
*D21H 27/00* (2006.01)
*D21H 27/02* (2006.01)
*B31F 1/07* (2006.01)

(52) U.S. Cl.
CPC .............. *B32B 5/26* (2013.01); *B32B 37/20* (2013.01); *B65B 25/14* (2013.01); *B65B 35/50* (2013.01); *B65B 63/00* (2013.01); *D21H 27/002* (2013.01); *D21H 27/02* (2013.01); *B31F 2201/0733* (2013.01); *B31F 2201/0764* (2013.01); *B31F 2201/0789* (2013.01); *B31F 2201/0794* (2013.01); *B31F 2201/0797* (2013.01); *B32B 2262/062* (2013.01); *B32B 2432/00* (2013.01)

(58) Field of Classification Search
CPC ...... D21H 23/72; D21H 27/002; D21H 27/02; D21H 27/30; D21H 27/40; B31F 1/07; B31F 5/022; B31F 2201/0733; B31F 2201/0764; B31F 2201/0789; B31F 2201/0794; B31F 2201/0797
See application file for complete search history.

(56) References Cited

U.S. PATENT DOCUMENTS

| | | | |
|---|---|---|---|
| 5,429,686 A | 7/1995 | Chiu et al. | |
| 5,543,202 A * | 8/1996 | Clark et al. | B31F 1/07 428/154 |
| 5,616,207 A | 4/1997 | Sudall et al. | |
| 5,667,635 A * | 9/1997 | Win et al. | B31F 1/07 162/158 |
| 5,874,157 A * | 2/1999 | Robinson et al. | B31F 1/07 428/194 |
| 6,146,568 A | 11/2000 | Tanner et al. | |
| 6,187,137 B1 | 2/2001 | Druecke et al. | |
| 6,572,722 B1 * | 6/2003 | Pratt | B31F 1/07 156/290 |
| 6,991,706 B2 | 1/2006 | Lindsay et al. | |
| 7,008,507 B2 | 3/2006 | Urlaub et al. | |
| 7,182,837 B2 | 2/2007 | Chen et al. | |
| 7,879,188 B2 | 2/2011 | Dyer et al. | |
| 8,414,738 B2 | 4/2013 | Rekoske et al. | |
| 8,894,799 B2 | 11/2014 | Lakrout | |
| 10,378,151 B2 * | 8/2019 | Yamada | B31F 1/07 |
| 2003/0111169 A1 * | 6/2003 | Baggot et al. | B31F 1/07 156/308.2 |
| 2005/0087317 A1 * | 4/2005 | Rydell | D21H 11/18 162/158 |
| 2006/0037724 A1 | 2/2006 | Akai et al. | |
| 2007/0048357 A1 * | 3/2007 | Shannon | D21H 17/66 424/443 |
| 2007/0137811 A1 | 6/2007 | Runge et al. | |
| 2009/0286437 A1 | 11/2009 | Cunningham et al. | |
| 2012/0090112 A1 * | 4/2012 | Carrier et al. | D21H 27/002 15/104.93 |
| 2012/0160436 A1 * | 6/2012 | Zwick et al. | D21H 27/30 162/158 |
| 2013/0101817 A1 | 4/2013 | Iwasaki | |
| 2015/0223662 A1 | 8/2015 | Doherty-Stapp et al. | |
| 2015/0330029 A1 | 11/2015 | Ramaratnam et al. | |
| 2016/0265165 A1 | 9/2016 | Proctor, Sr. | |
| 2017/0114503 A1 | 4/2017 | Konishi et al. | |
| 2017/0211234 A1 * | 7/2017 | Baer et al. | D21H 27/30 |
| 2017/0254023 A1 * | 9/2017 | Sumnicht et al. | D21H 27/002 |

FOREIGN PATENT DOCUMENTS

| | | |
|---|---|---|
| CN | 106715776 A | 5/2017 |
| JP | 2008002017 A | 1/2008 |
| WO | 2016023856 A1 | 2/2016 |

\* cited by examiner

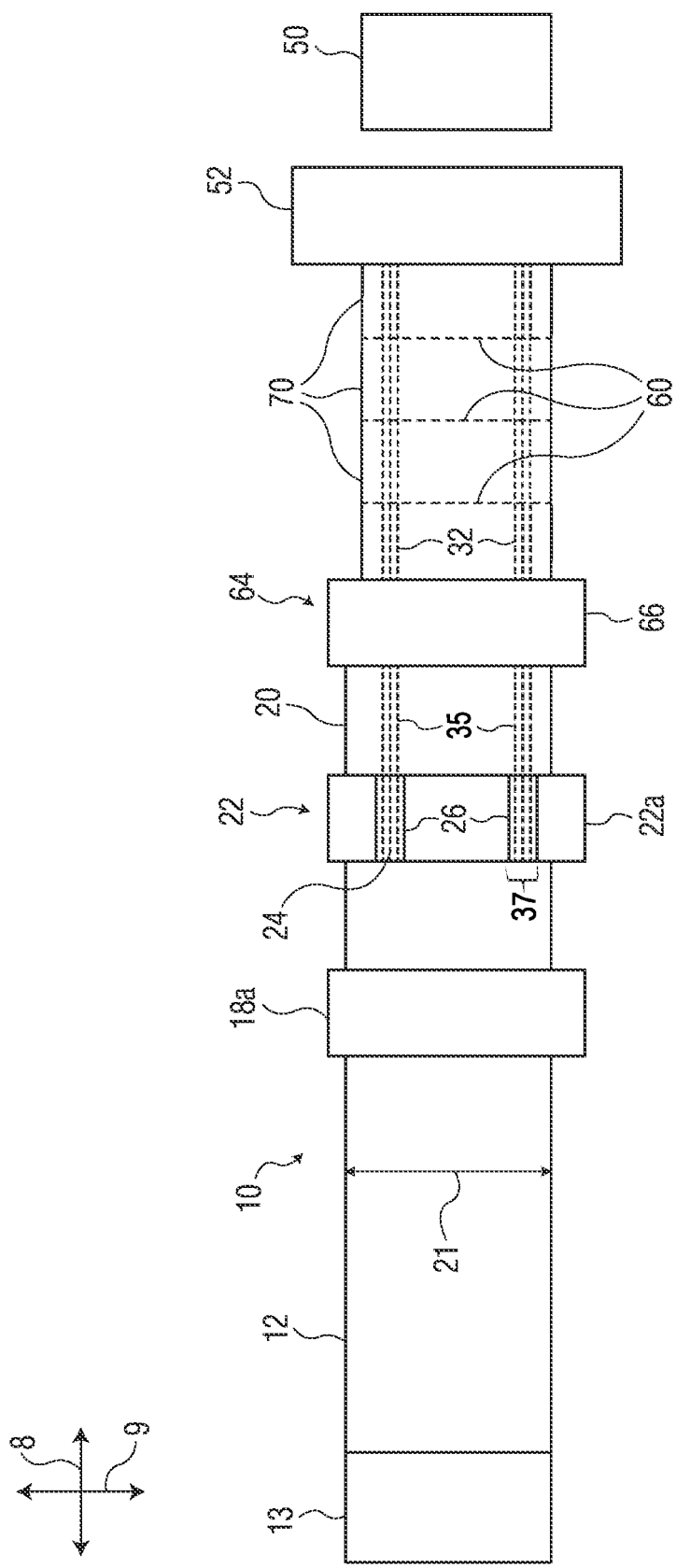

PROCESS FOR MAKING A MULTI-PLY DISPERSIBLE WIPE

BACKGROUND OF THE INVENTION

Pre-moistened wipes are popular in the marketplace, including baby wipes, toddler wipes, surface cleaning wipes, feminine wipes, hemorrhoid wipes, make-up removal wipes, and child and adult toileting wipes. Consumers flush many of these wipes down the toilet. Some of the wipes are designed to be flushed, and labeled as such. It is important that wipes that are intended to be flushed are compatible with sewer and septic systems, but also important that such wipes do not fall apart when used for their intended purpose. Specifically, when a flushable disposable product is flushed down a toilet into sewer or septic systems, the product, or designated portions of the product, should degrade or break apart (that is, disperse) as it moves through various steps of wastewater processing.

One common approach to making a flushable wet wipe is using "hydroentangling" technology, in which fibers, primarily or exclusively cellulosic fibers, are "entangled" together using very small high-pressure water jets. However, some wipes made with this technology require a substantial amount of agitation to break apart after flushing, and may not lose significant strength in relatively static environments.

Another conventional approach to making a wet wipe that exhibits satisfactory in-use strength, but that adequately breaks down in sewer or septic systems, is via the use of a binder on a substrate comprising cellulose fibers. The binder attaches to cellulose fibers, and bonds those fibers together in a network to deliver in-use strength. The binder is stable and delivers this strength when soaking in a stabilizing solution, but swells and weakens in the fresh water of the toilet and sewer system, thus allowing the fiber network to break apart. One variant of such a binder/stabilizing solution is a salt-sensitive triggerable binder, such as that disclosed in U.S. Pat. No. 6,994,865. However, such binders can be relatively expensive, and it can be challenging to achieve the right balance of in-use wipe strength and post-flush dispersibility.

What is needed is a wet wipe that combines sufficient in-use strength, sufficient thickness, and adequate dispersibility after flushing.

SUMMARY OF THE INVENTION

In a first embodiment, the invention provides a process for making a multi-ply dispersible wipe. The process includes providing a first web and a second web, each web comprising cellulose fibers; superposing the first web over the second web; applying an aqueous solution to the first web; after the aqueous solution is applied to the first web, crimping the second web to the first web to create a composite web; dividing the composite web into a plurality of discrete, multi-ply wet wipes, each multi-ply wet wipe having a crimp pattern; stacking the wipes into a stack; and packaging the plurality of multi-ply wet wipes into a package.

In a second embodiment, the invention provides a process for making a multi-ply dispersible wipe. The process includes providing a first web and a second web, each web comprising cellulose fibers; superposing the first web over the second web; applying an aqueous solution to the first web; after the aqueous solution is applied to the first web, crimping the second web to the first web to create a composite web; creating lines of weakness in the composite web adapted to allow the composite web to be manually separated into discrete multi-ply wet wipes, each multi-ply wet wipe having a crimp pattern; and packaging the composite web into a package.

In a third embodiment, the invention provides the process of the first or second embodiments wherein neither the first web nor the second web contains non-cellulosic fibers.

In a fourth embodiment, the invention provides the process of any of the first through third embodiments wherein the aqueous solution includes preservatives.

In a fifth embodiment, the invention provides the process of any of the first through fourth embodiments comprising further applying the aqueous solution to the second web before crimping the second web to the first web.

In a sixth embodiment, the invention provides the process of any of the first through fifth embodiments wherein the first web and the second web are each hydro-entangled webs.

In a seventh embodiment, the invention provides the process of any of the first through sixth embodiments wherein the first web is brought into contact with the second web before the aqueous solution is applied to either the first web or the second web.

In an eighth embodiment, the invention provides the process of any of the first through seventh embodiments wherein the first web and the second web each have a dry basis weight of less than 70 grams per square meter.

In a ninth embodiment, the invention provides the process of any of the first through eighth embodiments wherein the aqueous solution is present in the composite web at a concentration of over 100 percent, and more particularly by over 210 percent, by weight based on the dry weight of the composite web.

In a tenth embodiment, the invention provides the process of any of the first through ninth embodiments wherein the crimp pattern includes a plurality of depressions, the plurality of depressions collectively occupying less than 30 percent of the surface area of each wet wipe.

In an eleventh embodiment, the invention provides the process of any of the first through tenth embodiments wherein the composite web extends along and moves in a machine direction, the composite web having a width that extends in the cross-machine direction, and wherein the crimp pattern includes a plurality of lanes of intermittent depressions, each lane extending generally in the machine direction and each lane having a width, further wherein a collective width of the lanes is less than 10 percent of the width of the composite web.

In a twelfth embodiment, the invention provides the process of any of the first through eleventh embodiments wherein a peel strength of the crimp pattern is at least 1.3 grams per linear centimeter.

In a thirteenth embodiment, the invention provides the process of any of the first through twelfth embodiments wherein the crimping is conducted at a pressure of at least 100 kilopascals.

In a fourteenth embodiment, the invention provides the process of any of the first through thirteenth embodiments wherein (1) the aqueous solution applied to the first web is a first aqueous solution; and (2) after the first aqueous solution is applied to the first web and after crimping the second web to the first web to create a composite web, a second aqueous solution is applied to the composite web.

In a fifteenth embodiment, the invention provides the process of the fourteenth embodiment wherein the first aqueous solution has a higher weight-percent water content than the second aqueous solution.

In a sixteenth embodiment, the invention provides the process of the fourteenth or fifteenth embodiments wherein the first aqueous solution is applied at a concentration of at least 100 percent by weight based on the dry weight of the composite web.

In a seventeenth embodiment, the invention provides the process of the fourteenth, fifteenth, or sixteenth embodiments wherein the second aqueous solution is applied at a concentration of at least 110 percent by weight based on the dry weight of the composite web.

In an eighteenth embodiment, the invention provides the process of any of the first through seventeenth embodiments wherein the crimping is performed using a crimping roll, wherein the crimping roll is heated to a temperature of between 100 and 300 degrees Celsius during the crimping.

BRIEF DESCRIPTION OF THE DRAWINGS

FIG. 5 is a top view of the embodiment of FIG. 4.

DETAILED DESCRIPTION OF PARTICULAR EMBODIMENTS

Figure 1:
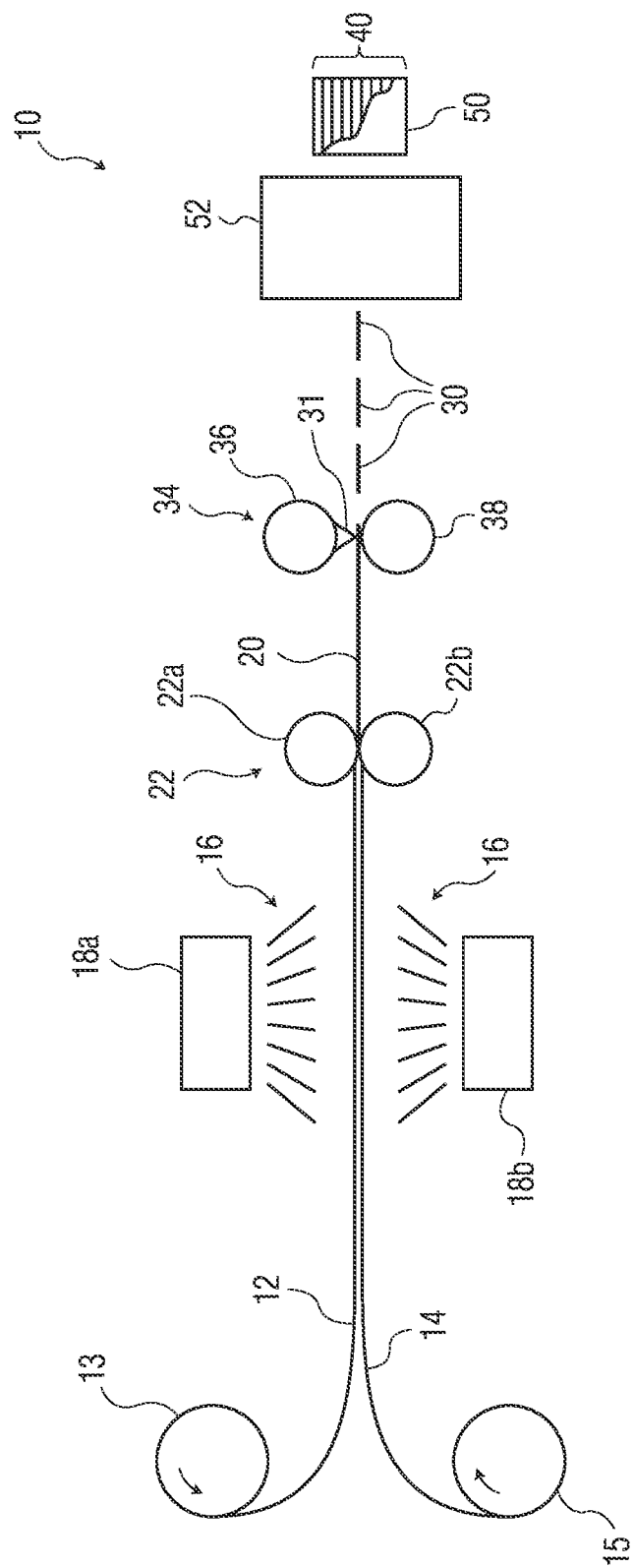
FIG. 1 is a side view of a schematic representation of one embodiment of the present invention.

A process 10 for making a multi-ply dispersible wipe includes providing a first web 12 and a second web 14. The webs 12, 14 can be formed in-line, or be provided preformed, such as unwound from web rolls 13, 15. The process can optionally include third, fourth, or more webs (not shown). Each web 12, 14 comprises cellulose fibers. In particular embodiments, each web consists of cellulose fibers. In certain embodiments, each web 12, 14 also contains non-cellulosic fibers, such as plastic fibers. In other embodiments, neither web 12 nor web 14 includes any non-cellulosic fibers. In particular embodiments, the webs 12, 14 include both regenerated cellulose fibers and non-regenerated cellulose fibers. In particular embodiments, the fibers of the first web 12 have been hydroentangled with one another, and the fibers of the second web 14 have been hydroentangled with one another. In other embodiments, the fibers of the first web 12 are held together via a chemical binder, and the fibers of the second web 14 are held together via a chemical binder. The webs 12, 14 can include wet-laid tissue webs, or can be non-woven webs. The term "nonwoven web" as used herein means a structure of fibers randomly formed in a mat-like fashion without the use of an aqueous slurry, in contrast to a wet-laid tissue. In particular embodiments, the first web 12 and the second web 14 each have a dry basis weight of less than 70 grams per square meter, and more particularly of between 25 and 55 grams per square meter.

In the process 10, the first web 12 is superposed over the second web 14, such that the two webs 12, 14 are in contact with each other. An aqueous solution 16 is applied to the first web 12, to the second web 14, or to both the first web 12 and second web 14, such as representatively illustrated in FIG. 1. The aqueous solution may be applied by application units 18a, 18b, and via methods known in the art, such as, by way of example, spraying (FIG. 1), rolling, pouring, or other suitable application method.

The aqueous solution 16 can be any liquid that can be absorbed into the first web 12 (or second web 14) and may include any suitable components that provide the desired wiping and processing properties. For example, the solution may include water, emollients, surfactants, fragrances, preservatives, organic or inorganic acids, chelating agents, pH buffers, or combinations thereof, as are well known to those skilled in the art. Further, the wetting solution may also contain lotions, medicaments, and/or antimicrobials. The wetting solution may contain additional agents that impart a beneficial effect on skin or hair and/or further act to improve the aesthetic feel of the compositions and wipes described herein. Examples of suitable skin benefit agents include emollients, sterols or sterol derivatives, natural and synthetic fats or oils, viscosity enhancers, rheology modifiers, polyols, surfactants, alcohols, esters, silicones, clays, starch, cellulose, particulates, moisturizers, film formers, slip modifiers, surface modifiers, skin protectants, humectants, sunscreens, and the like. In one example, the aqueous solution contains water. The aqueous solution can in particular embodiments contain water in an amount of from about 40 to about 99 percent of the total weight of the solution. In particular embodiments, the aqueous solution comprises 99.5 percent, or even more particularly 100 percent, water.

After the aqueous solution 16 is applied to the first web 12 (or to the first web 12 and the second web 14), the process further includes crimping the second web 14 to the first web 12 to create a composite web 20. "Crimping" means to press together using pressure distributed over discrete regions such as dots, lines, or shapes, such that the first web 12 and second web 14 are held securely together.

Figure 2:
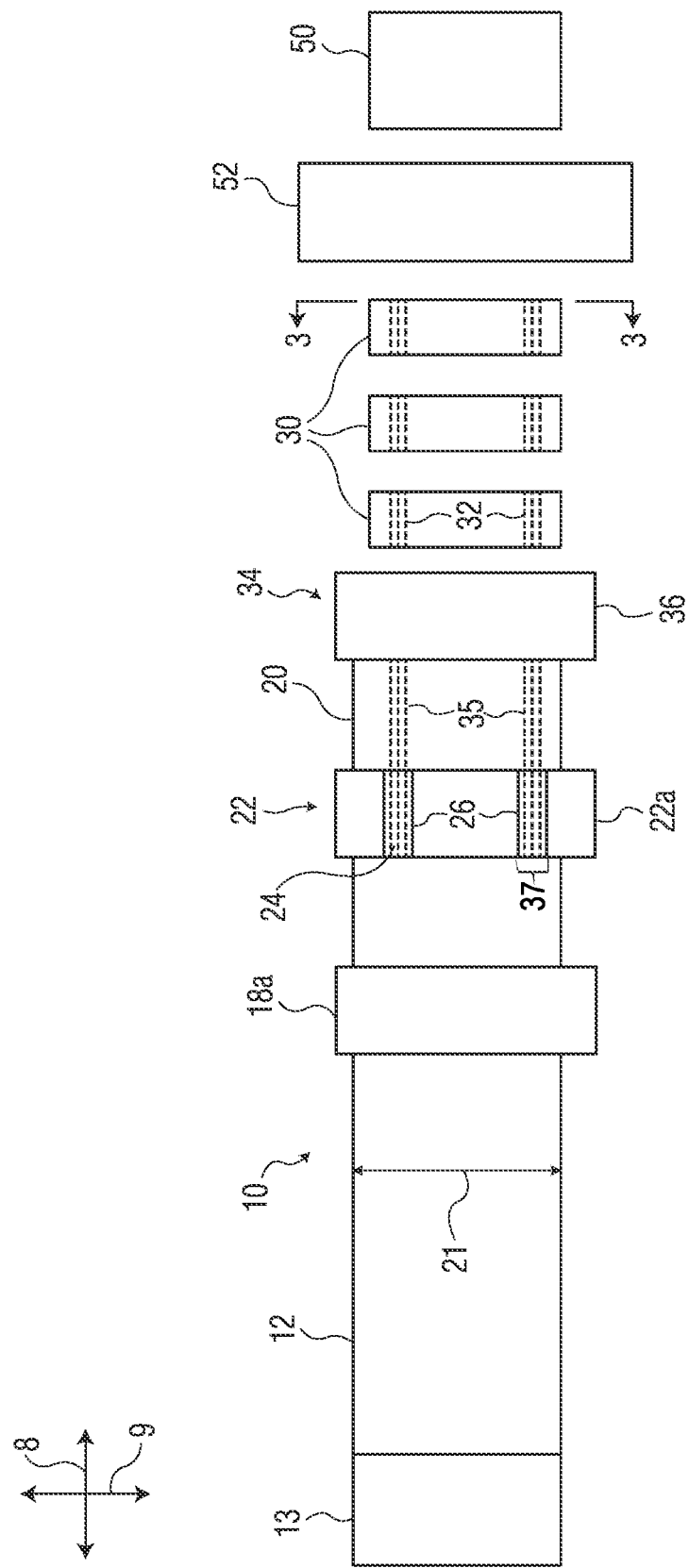
FIG. 2 is a top view of the embodiment of FIG. 1.
Figure 3:
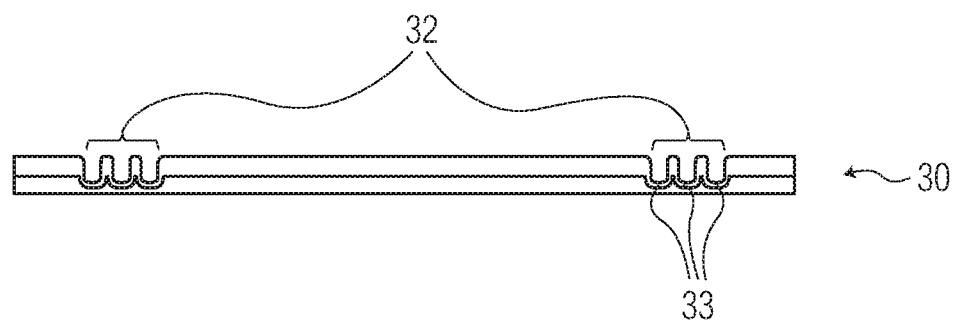
FIG. 3 is an end view of the wipe of FIG. 2 taken along line 3-3.

The crimping can be performed via a crimping unit 22, which can optionally include a patterned roll 22a and an anvil roll 22b. In particular embodiments, such as that representatively illustrated in FIG. 2, the patterned roll 22a includes projections 24, such as two or more lanes 26, 26 of projections 24. In particular embodiments, the crimping is conducted at a pressure of at least 100 kilopascals, more particularly at least 200 kilopascals, and more particularly between about 250 and 350 kilopascals. In particular embodiments, the patterned roll 22a has a steel surface and the anvil roll 22b has a rubber surface. In other embodiments, both the patterned roll 22a and the anvil roll 22b have a steel surface.

After the crimping occurs, the process in particular embodiments (referring to FIGS. 1 and 2) further includes dividing the composite web 20 into a plurality of discrete, multi-ply wet wipes 30, such as at separating unit 34 that optionally includes a cutting roll 36 and an anvil roll 38. The cutting roll includes one or more knives 31. Each multi-ply wet wipe 30 has a crimp pattern 32, imparted by the crimping unit 22.

The process 10 further includes stacking the plurality of multi-ply wet wipes 30 into a stack 40, and packaging the plurality of multi-ply wet wipes 30 into a package 50, such as via packaging unit 52, which could be a bagger or other packaging unit known in the art. Preferably, the package 50 is made of substantially moisture-impervious material, such as a polymeric film or plastic tub.

Figure 4:
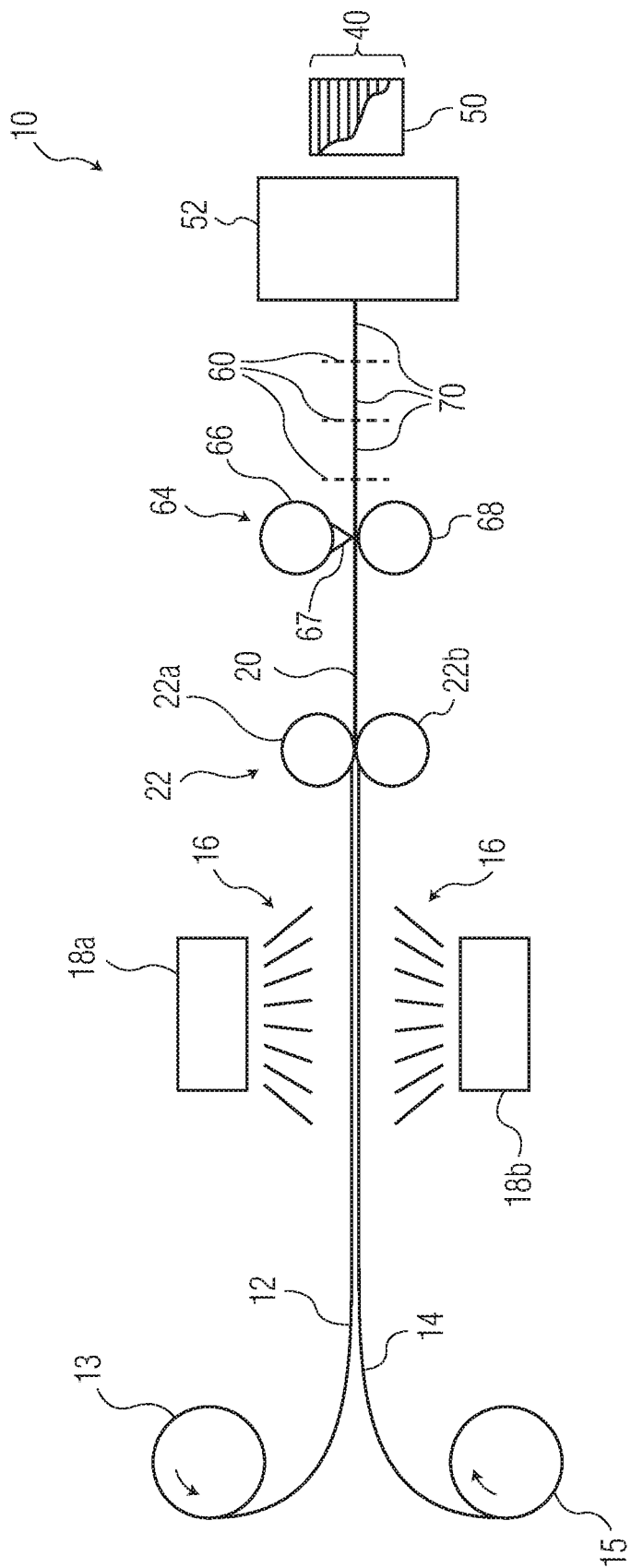
FIG. 4 is a side view of a schematic representation of another embodiment of the present invention.

Referring to FIGS. 4 and 5, in other embodiments, instead of dividing the composite web 20 into discrete wipes 30, the process includes creating lines of weakness 60 (such as perforations or score lines) in the composite web 20 to define a series of interconnected wet wipes 70. The lines of weakness 60 are adapted to allow the composite web 20 to be manually separated (e.g., torn) into discrete multi-ply wet wipes. The lines of weakness can be imparted, by way of example, via a perforation unit 64, having a perforating roll 66, an anvil roll 68, and a perforating knife 67. Such embodiments can further include packaging the composite web (or a portion of the composite web) into a package 50, such as by accumulating the composite web into a roll, or into a z-fold or "accordion" stack.

The aqueous solution 16 may be applied to the webs 12, 14 at a concentration of from about 10 to about 600 percent, more desirably at least 100 percent, more desirably from about 100 to about 500 percent, even more desirably from about 200 to about 400 percent, and in particular of at least 210 percent by weight, measured as a percent of the dry weight of the composite web.

The crimp pattern 32 includes a plurality of depressions 33. In particular embodiments, the plurality of depressions 33 collectively occupy less than 30 percent of the surface area of each wet wipe. The composite web 20 extends along and moves in a machine direction 8 in the process 10, and the composite web 20 has a width 21 that extends in the cross-machine direction 9. In particular embodiments, the crimp pattern 32 includes a plurality of lanes 35 of intermittent depressions 33 that extend in the machine direction 9. Each lane has a width 37 that extends in the cross-machine direction 9. The width 37 is defined as the distance between two imaginary straight lines that extend in the machine direction 8 and that bound the inner and outer edges of each lane 35 of clustered depressions. The collective width of the lanes 35 is less than 10 percent, more particularly less than 5 percent, and still more particularly less than 3 percent of the width 21 of the composite web 20.

Conventionally, to make multi-ply tissue products, tissue layers are crimped together when the sheets are relatively dry. It has been discovered by the inventors that if the layers are first wetted, and then crimped together, that the crimped attachment strength is greater than achievable by "dry" crimping. Furthermore, after wetting the webs 12, 14 and crimping them together to form the composite web 20, it is not necessary to dry the composite web 20, because the composite web 20 is converted into individual wet wipes 30, which are packaged in the wet condition. Constructing a multi-ply tissue-based wet wipe is advantageous, because it has been found that by constructing the wipe in layers, the wipe can more quickly and easily disperse after flushing. This is because the layers delaminate from each other, leaving two (or more) relatively weaker layers that must disperse, as opposed to a single, thicker, relatively stronger layer. In particular embodiments of the present invention, the "wet crimping" technique allows the layers to remain securely adhered to each other during packaging, dispensing, and in-use wiping, while still allowing the layers to release free from each other after flushing.

In particular embodiments, a peel strength of the crimp pattern is at least 1.3 gram, and more particularly 1.44-2.23 grams per linear centimeter.

EXAMPLE

A two-ply wet wipe "wet crimping" embodiment ("Illustrative Example") was created using two plies of hydroentangled tissue basesheet. The wipe was 200 centimeters long and 125 centimeters wide. Each ply had a basis weight of 55 grams per square meter. An aqueous solution was applied at a concentration of approximately 230 percent based on the dry weight of the two-ply composite web. The plies were crimped together via a crimp pattern comprised of two lanes of dots. Each lane consisted of 3 lines of dots. Each dot had a diameter of 0.9 millimeters. The dots were spaced apart (center to center) by 2.5 millimeters in the direction in which each line extended. The lines were spaced apart from each other (center to center) by 2.0 millimeters, such that the width of each lane of lines was about 5 millimeters, and such that the collective width of all lanes (that is, the sum of the widths of all lanes) was about 10 millimeters. Each lane was spaced in from opposite longitudinal edges of the wipes by about 10 millimeters. The crimping was conducted at a pressure of 300 kilopascals.

A "dry crimping" Comparative Example was created as above, except that the aqueous solution was not applied until after the crimping pattern had been applied to the composite web.

The crimp peel strength of a 7.62-centimeter-long segment of a single lane of crimp dots was examined, from both the Illustrative Example and the Comparative Example, using a conventional tensile strength tester. The two plies of the wipe were peeled apart, in a direction perpendicular to the direction in which the lane of crimp dots extended. The jaws of the tester moved apart at a rate of 100 millimeters per minute. Five specimens were tested for the Illustrative Example, and five specimens were tested for the Comparative Example.

The crimp peel strength of each "wet crimping" specimen of the Illustrative Example was between 1.44 and 2.23 grams per linear centimeter. In contrast, the crimp peel strength of each "dry crimping" specimen of the Comparative Example was between 0.65 and 1.18 grams per linear centimeter. Consequently, the two plies of the "wet crimped" wipes were held together significantly more strongly than the two plies of the "dry crimped" wipes.

Other modifications and variations to the appended claims may be practiced by those of ordinary skill in the art, without departing from the spirit and scope as set forth in the appended claims. It is understood that features of the various examples may be interchanged in whole or part. The preceding description, given by way of example in order to enable one of ordinary skill in the art to practice the claimed invention, is not to be construed as limiting the scope of the invention, which is defined by the claims and all equivalents thereto.

What is claimed is:

1. A process for making a multi-ply dispersible wipe, comprising:
   providing a first web and a second web, each web comprising cellulose fibers;
   superposing the first web over the second web;
   applying an aqueous solution to the first web;
   after the aqueous solution is applied to the first web, crimping the second web to the first web to create a composite web wherein the aqueous solution is present in the composite web at a concentration of over 210 percent by weight based on the dry weight of the composite web;
   dividing the composite web into a plurality of discrete, multi-ply wet wipes, each multi-ply wet wipe having a crimp pattern;
   stacking the wipes into a stack; and
   packaging the plurality of multi-ply wet wipes into a package.

2. The process of claim 1 wherein neither the first web nor the second web contains non-cellulosic fibers.

3. The process of claim 1 wherein the aqueous solution includes preservatives.

4. The process of claim 1, comprising further applying the aqueous solution to the second web before crimping the second web to the first web.

5. The process of claim 1 wherein the first web and the second web are each hydro-entangled webs.

6. The process of claim 1 wherein the first web is brought into contact with the second web before the aqueous solution is applied to either the first web or the second web.

7. The process of claim 1 wherein the first web and the second web each have a dry basis weight of less than 70 grams per square meter.

8. The process of claim 1 wherein the aqueous solution comprises 99.5 percent water.

9. The process of claim 1 wherein the crimp pattern includes a plurality of depressions, the plurality of depressions collectively occupying less than 30 percent of the surface area of each wet wipe.

10. The process of claim 1 wherein the composite web extends along and moves in a machine direction, the composite web having a width that extends in the cross-machine direction, and wherein the crimp pattern includes a plurality of lanes of intermittent depressions, each lane extending generally in the machine direction and each lane having a width, further wherein a collective width of the lanes is less than 10 percent of the width of the composite web.

11. The process of claim 1 wherein a peel strength of the crimp pattern is at least 1.3 grams per linear centimeter.

12. The process of claim 1 wherein the crimping is conducted at a pressure of at least 100 kilopascals.

13. The process of claim 1 wherein (1) the aqueous solution applied to the first web is a first aqueous solution; and (2) after the first aqueous solution is applied to the first web and after crimping the second web to the first web to create a composite web, a second aqueous solution is applied to the composite web.

14. The process of claim 13 wherein the first aqueous solution has a higher weight-percent water content than the second aqueous solution.

15. The process of claim 13 wherein the first aqueous solution is applied at a concentration of at least 100 percent by weight based on the dry weight of the composite web.

16. The process of claim 15 wherein the second aqueous solution is applied at a concentration of at least 110 percent by weight based on the dry weight of the composite web.

17. The process of claim 1, wherein the crimping is performed using a crimping roll, wherein the crimping roll is heated to a temperature of between 100 and 300 degrees Celsius during the crimping.

* * * * *